(12) United States Patent
Chiang et al.

(10) Patent No.: US 6,562,510 B1
(45) Date of Patent: May 13, 2003

(54) BATTERY CARD AND ELECTRICAL APPARATUS USING SAME BATTERY CARD ASSEMBLY

(76) Inventors: Cyril C. K. Chiang, 5 Fl., No. 5, Ln1, Aly24, Jen-Ai Rd., Sec. 3, Taipei (TW); Min Hon Rei, 6512 43rd Ave. NE., Seatle, WA (US) 98115

( * ) Notice: Subject to any disclaimer, the term of this patent is extended or adjusted under 35 U.S.C. 154(b) by 0 days.

(21) Appl. No.: 09/353,260

(22) Filed: Jul. 14, 1999

(51) Int. Cl.$^7$ .................................................. H01M 2/10
(52) U.S. Cl. .............................. 429/100; 429/98; 429/99
(58) Field of Search .................................. 429/96–100

(56) References Cited

U.S. PATENT DOCUMENTS

| | | | |
|---|---|---|---|
| 4,828,944 A | * 5/1989 | Yabe et al. | ..................... 429/97 |
| 5,075,182 A | * 12/1991 | Weber | ............................ 429/1 |
| 5,188,912 A | * 2/1993 | Katoh et al. | ................... 429/96 |
| 5,714,716 A | * 2/1998 | Yamada | ...................... 174/52.1 |

* cited by examiner

*Primary Examiner*—Carol Chaney
(74) *Attorney, Agent, or Firm*—Michael Best & Friedrich LLC; J. Warren Whitesel

(57) ABSTRACT

A battery power supply system consisting of battery card, battery card assembly where battery card slots in, and charger where battery card gets recharged is disclosed. The standardized battery card is designed in light, thin, safe, and user-friendly card configuration to make interchangeability between appliances easy and possible. The battery card assembly is designed either for single or multiple battery cards. In the case of using single battery card, the battery card assembly electrically connects to a power buffer in the electrical apparatus so the user can change their battery card without turning off the electrical apparatus within a certain time interval. In the case of multiple battery cards, the battery card assembly connects power to the electrical apparatus from only one of the battery cards. Until the first battery card is completely discharged, the battery card assembly automatically switches to another battery card without disturbing the electrical apparatus operation.

6 Claims, 9 Drawing Sheets

BATTERY CARD AND ELECTRICAL APPARATUS USING SAME BATTERY CARD ASSEMBLY

FIELD OF THE INVENTION

The present invention relates to a battery pack and an electrical apparatus using the battery pack, and more particularly to a battery card and an electrical apparatus using same battery card assembly.

BACKGROUND OF THE INVENTION

At the present time, all portable electrical apparatus including portable information appliances use internal battery pack for energy source. Battery pack contains several battery cells in series and/or in parallel arrangement, making the desired capacity and voltage to operate the appliance.

Battery cells in battery pack for portable information appliances are of two major categories, i.e., nickel metal hydride (NiMH) and lithium ion (Li-ion), because of their relatively high energy density. Conventional battery cells are configured in cylindrical and/or prismatic structures. Generally speaking, battery pack strictures are determined by battery cell configurations. Battery packs are bulky, heavy, and expensive when multiple battery cells are integrated. FIG. 1 shows an industry standard battery pack for notebook computers. The battery pack 1 consisting of nine cylindrical battery cells delivers 44 Wh (10.8V×4.05 Ah) with 150(W)× 90(L)×21(T) mm in size and 490 grams in weight. Such a battery pack 1 is able to operate a Pentium 300 notebook computer for approximately 3 hours (180 minutes).

Lately battery packs are designed as thin and light as possible in an attempt to fit slimmer and more compact appliances. FIG. 2 shows a slim battery pack for notebook computers containing prismatic battery cells. The battery pack 2 containing several prismatic Li-ion battery cells has higher weight and volume energy density. Compared to the battery pack 1 of FIG. 1, the battery pack 2 of FIG. 2 has a reduced dimension in thickness because of using prismatic battery cells, normally less than 10 mm. However, battery run time is compromised because less conducting materials are used in smaller battery cells. Users have found difficulty in maintaining power continuity. With more frequent power shortage, data integrity becomes vulnerable in some worst scenarios. Hence, users must carry more battery packs than they actually need when they travel and worry about losing data when battery power exhausts.

In general, notebook computers incorporate only one battery pack. For heavy users, however, there are notebook computers mounted with two battery packs. They are not considered practical as weight and inconvenience are in concern. Most battery packs are unequivocally designed for one specific appliance, completely neglecting interchangeability between appliances. Users are confined by inflexible battery pack form factor. Appliance manufacturers, as a result, are able to control battery accessory market at hefty prices with limited availability.

Specifically designed battery packs usually present specific safety concerns when inadvertently used outside the manufacturer's recommended guidelines. Recently, in-seat power supply system on aircraft has drawn public attention because users rarely detect battery health before they charge their battery in flight. Manufacturers have recommended Federal Aviation Administration (FAA) to place a moratorium on the use until safety issues can be resolved.

All listed disadvantages are obstacles to popularize portable information appliances. The present invention provides solutions with an entirely shifted paradigm.

SUMMARY OF THE INVENTION

It is therefore an object of the present invention to provide a battery power system that provides non-interruptible energy by easy swapping battery packs in user-friendly formats so that the user can change their battery packs without turning off the electrical apparatus when the battery pack runs short of capacity. Therefore, the improved battery power system enables a user to solve the shorter run time dilemma as portability requires battery packs continue to shrink. Instead of adding more power to appliance, the present invention brings a different pattern using battery cards to provide a minimum run time that satisfies general applications whereas the system upholds power continuity.

It is further an object of the present invention to provide a safe battery power system, by which issues of public safety can be minimized without adding any inconvenience to mobile users when battery cards are charged on a separate charger outside the appliance or a charger built-in the appliance.

It is further an object of the present invention to provide an improved battery power system, which enables the user to carry no more power than they actually need and no longer worry losing data when battery power exhausts.

The present invention provides a battery card assembly or cartridge which is adapted to be used with an electrical apparatus to be power-supplied by a battery card contained in the battery card assembly. According to the present invention, the electrical apparatus has a casing having a slot for mounting therein the battery card assembly. The battery card assembly includes an assembly body insertable into the slot of the electrical apparatus and having a card slit for replaceably inserting therein the battery card, and a retaining mechanism mounted in the assembly body for keeping the battery card in the card slit for power-supplying the electrical apparatus in a first instance and disengaging the battery card from the card slit out of the assembly body in a second instance.

In accordance with one aspect of the present invention, the battery card assembly further includes a guiding mechanism for guiding the battery card to be inserted into the card slit. Preferably the guiding mechanism includes two opposite guiding side rails mounted in the assembly body.

In accordance with another aspect of the present invention, the battery card assembly further includes a movable door for closing the card slit, and an elastic member for always closing the movable door against the card slit.

Preferably the retaining mechanism includes an actuating button which protrudes beyond the casing in the first instance and generally remains flush with the casing in the second instance.

Certainly, the battery card has two power contacts and the assembly body includes a power receiving medium for being electrically connected to the two power contacts of the battery card for receiving therethrough a power from the battery card. Preferably the power receiving medium includes two conductors for respectively being electrically connected to the two power contacts of the battery card, and the assembly body includes a power cord electrically connected to the two conductors and having a terminal connector.

Preferably the assembly body further includes another card slit for inserting therein another battery card.

Preferably the battery cards are of the same dimension. Alternatively, the battery cards are of different dimensions.

Preferably the card slits are of the same size. Alternatively, the card slits are of different sizes.

In accordance with another aspect of the present invention, the battery card assembly further electrically connects therein a control circuit controlling from which battery card the electrical apparatus should be power-supplied.

Preferably the control circuit includes diode switches, charger/protection circuit, fuel gauge circuit, and LED display circuit.

Preferably the battery card assembly electrically connects therein a capacity detector for detecting how much capacity the battery cards keep.

In accordance with another aspect of the present invention, the battery card assembly further electrically connects therein a power shortage warner which will signal when either one of the battery cards nearly runs short of capacity.

In accordance with another aspect of the present invention, the battery card assembly further includes a display electrically connected to the power shortage warner for showing that the one battery card nearly runs short of capacity.

It is yet an object of the present invention to provide a battery card assembly adapted to be used with an electrical apparatus to be power-supplied by a battery card contained in the battery card assembly. The battery card assembly includes an assembly body electrically connected to the electrical apparatus and having a card slit for replaceably inserting therein the battery card, and a retaining mechanism mounted in the assembly body for keeping the battery card in the card slit for power-supplying the electrical apparatus in a first instance and disengaging the battery card from the card slit out of the assembly body in a second instance.

It is still more an object of the present invention to provide a battery card assembly adapted to be used with an electrical apparatus, in which the electrical apparatus has a casing having a slot for mounting therein the battery card assembly, to be power-supplied by a battery card contained in the battery card assembly. The battery card assembly includes an assembly body insertable into the slot of the electrical apparatus and having a card slit for replaceably inserting therein the battery card.

In accordance with one aspect of the present invention, the battery card preferably has a weight energy density larger than 40 watt-hours/kilograms and a volume energy density larger than 100 watt-hours/liter. More preferably, the battery card has the weight energy density larger than 80 watt-hours/kilograms and the volume energy density larger than 200 watt-hours/liter.

Preferably the battery card has a thickness smaller than 1.5 cm, and more preferably smaller than 1 cm.

It is further another object of the present invention to provide a battery card assembly adapted to be used with an electrical apparatus to be power-supplied by a battery card contained in the battery card assembly. The battery card assembly includes an assembly body electrically connected to the electrical apparatus and having a card slit for replaceably inserting therein the battery card.

It is yet another object of the present invention to provide an electrical apparatus having a casing having a slot for mounting therein a battery card assembly having an assembly body having a card slit for replaceably inserting therein a battery card for power-supplying the electrical apparatus.

In accordance with one aspect of the present invention, the battery card preferably has a weight energy density larger than 40 watt-hours/kilograms and a volume energy density larger than 100 watt-hours/liter, and more preferably the battery card has weight energy density larger than 80 watt-hours/kilograms and volume energy density larger than 200 watt-hours/liter.

Preferably the battery card has a thickness smaller than 1.5 cm, and more preferably smaller than 1 cm.

Preferably battery card is substantially a parallelepiped having a dimension smaller than 15 cm, and more preferably the dimension is smaller than 10 cm.

It is still further an object of the present invention to provide an electrical apparatus includes a casing having a slot, a battery card assembly slidably insertable into the slot and having an assembly body having a card slit, a battery card replaceably inserted into the card slit for power-supplying the electrical apparatus, having a thickness smaller than 1.5 cm and having a weight energy density larger than 40 watt-hours/kilograms and a volume energy density larger than 100 watt-hours/liter.

Preferably the battery card is substantially a parallelepiped having a thickness smaller than 1 cm.

Preferably the battery card has a weight energy density larger than 80 watt-hours/kilograms and a volume energy density larger than 200 watt-hours/liter.

Preferably the battery card is rechargeable and the electrical apparatus further includes a charger for recharging the battery card.

Preferably the electrical apparatus further includes a power buffer so that the power buffer will assume the work for power-supplying the electrical apparatus when the battery card runs short of capacity.

Preferably the battery card assembly further includes another card slit for replaceably inserting therein another battery card.

Preferably the electrical apparatus electrically connects thereto a power control circuit for controlling from which one of the battery cards the electrical apparatus should be power-supplied.

Preferably the battery card assembly is formed into a cartridge, and the electrical apparatus further includes a display for warning a user that one of the battery cards runs short of capacity.

The present invention may best be understood through the following descriptions with reference to the accompanying drawings, in which:

DETAILED DESCRIPTION OF THE PREFERRED EMBODIMENT

The present invention is a battery power supply system consisting of battery card, battery card assembly where battery card slots in, and charger where battery card gets recharged. Battery cards are designed in light, thin, and user-friendly configuration and easy to carry, to store, and to exchange. Battery card assembly is a standard component in portable information appliances that receives battery card or battery cards in fixed formats. Charger is an accessory for safely recharging multiple battery cards with state-of-the-art charging algorithm.

Figure 1:
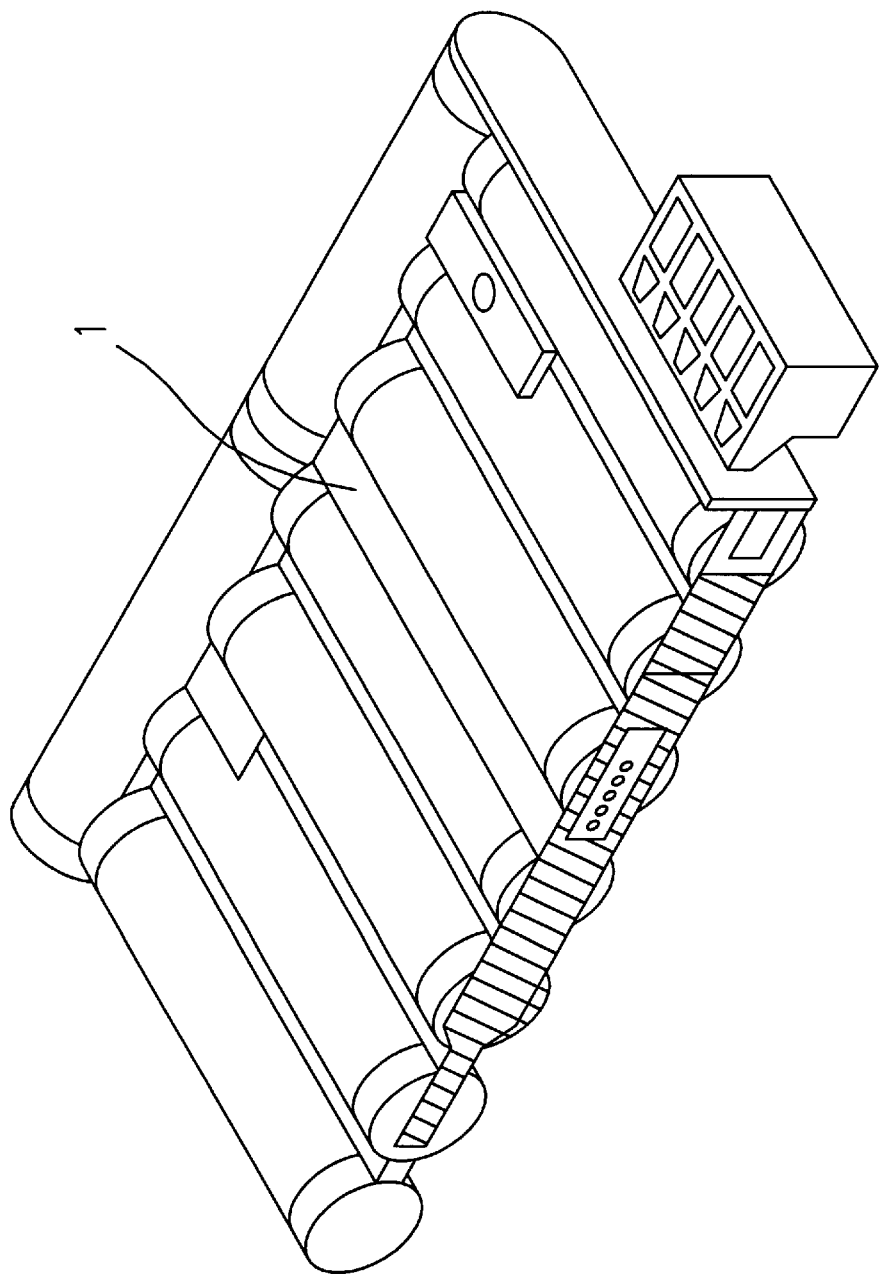
FIG. 1 is a conventional battery pack for notebook computer containing cylindrical battery cells.
Figure 2:
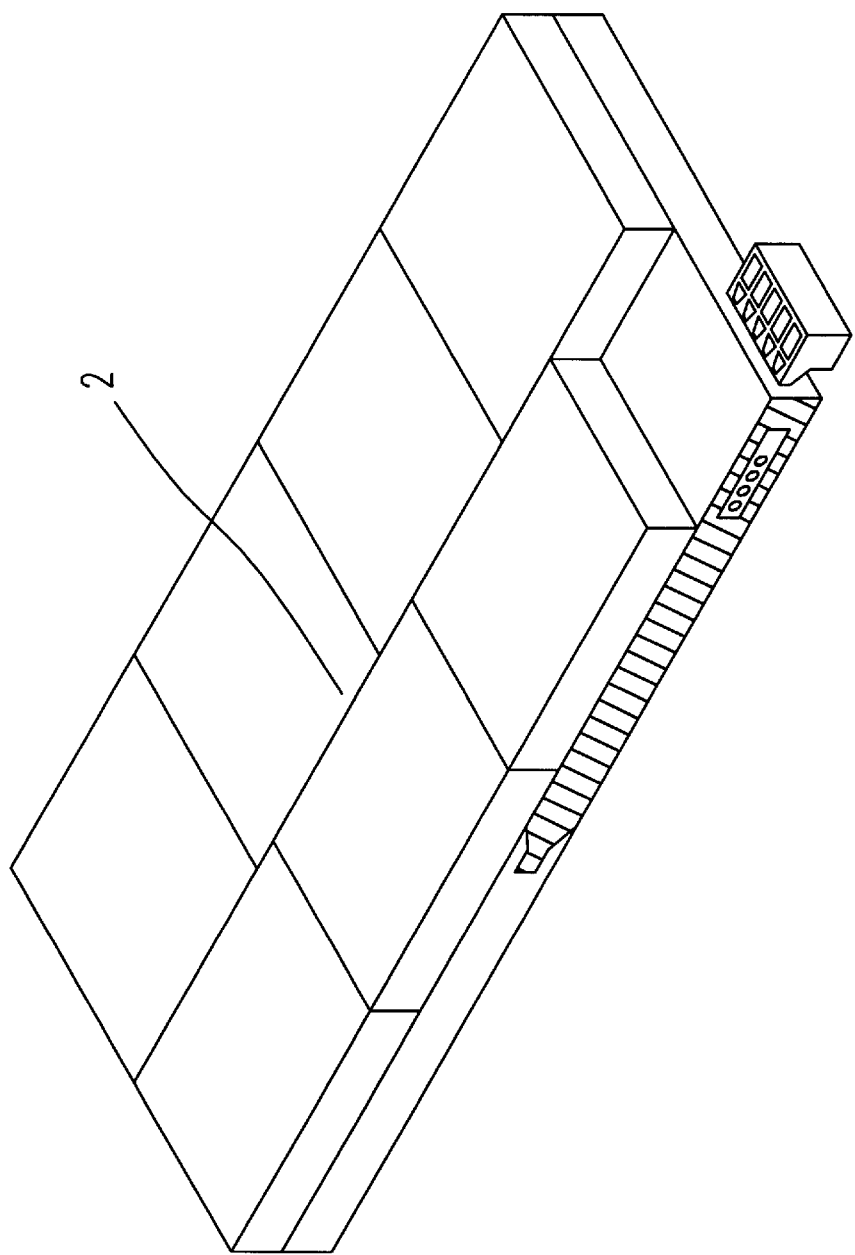
FIG. 2 is a conventional battery pack for notebook computer containing prismatic battery cells.
Figure 3:
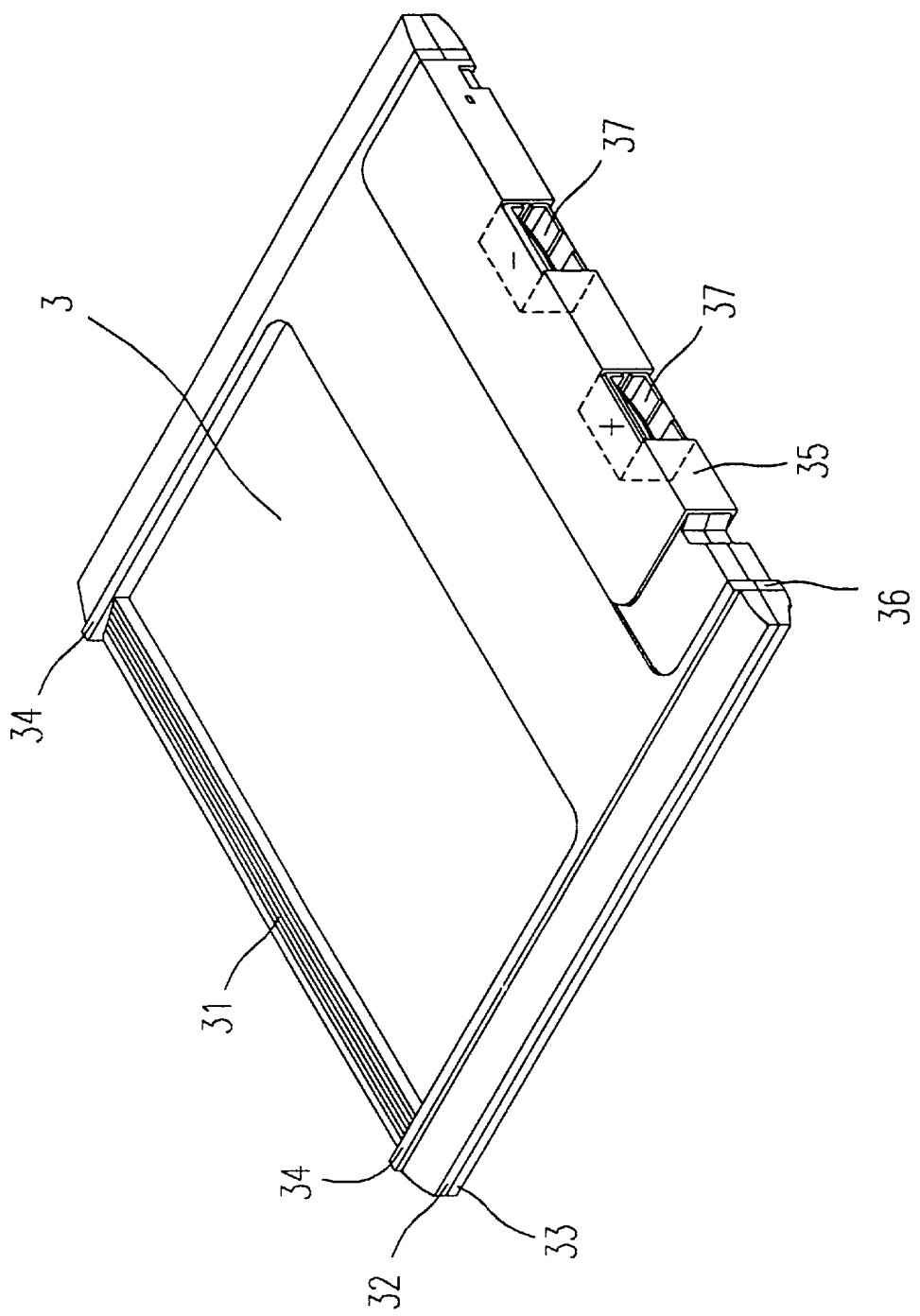
FIG. 3 shows the schematic diagram of a preferred battery card according to the present invention.

The battery card is adapted to be used with an electrical apparatus to be power-supplied by the battery card. Preferably, the electrical apparatus is a portable information appliance. FIG. 3 shows a basic design of the battery card. The battery card 3 includes a housing 31 made of upper shell 32 and lower shell 33. Along the surface there are tracking rails 34 that match the battery card to a cartridge (not shown) where the battery card slots in. A shutter 35 is provided on the front peripheral edge 36 of the housing 31 to expose the access 37, which contains "+" and "−" power outputs, when the battery card 3 is inserted into the cartridge (not shown), to cartridge terminal. The battery card of the present invention has a weight energy density larger than 40 watt-hours/kilograms and a volume energy density larger than 100 watt-hours/liter. Preferably, the battery card has a weight energy density larger than 80 watt-hours/kilograms and a volume energy density larger than 200 watt-hours/liter. The housing of the battery card has a major square plane. Preferably the plane has either one of sides thereof shorter than 10 cm. Alternatively, the housing of the battery card is substantially a paralleleiped having a thickness smaller than 1.5 cm, and more preferably less than 1 cm. The parallelepiped has either one of sides thereof smaller than 15 cm, preferably less than 10 cm.

The battery card of the present invention is recharagable. The battery card electrically connects therein a recharging circuit (not shown) for enabling the battery card to be recharged thereby. Therefore, the battery card can be recharged by an independent charger outside the electrical apparatus, by connection to charger within the electrical apparatus, or by connection to wall power jack for direct charge from AC power supply.

The battery card assembly of the present invention is adapted to be used with an electrical apparatus, in which the electrical apparatus has a casing having a slot for mounting therein the battery card assembly, to be power-supplied by a battery card contained in the battery card assembly.

The battery card assembly of the present invention includes an assembly body insertable into the slot of the electrical apparatus and having a card slot for replaceably inserting therein the battery card, and a retaining mechanism mounted in the assembly body for keeping the battery card in the card slot for power-supplying the electrical apparatus in a first instance and disengaging the battery card from the card slit out of the assembly body in a second instance.

Figure 4:
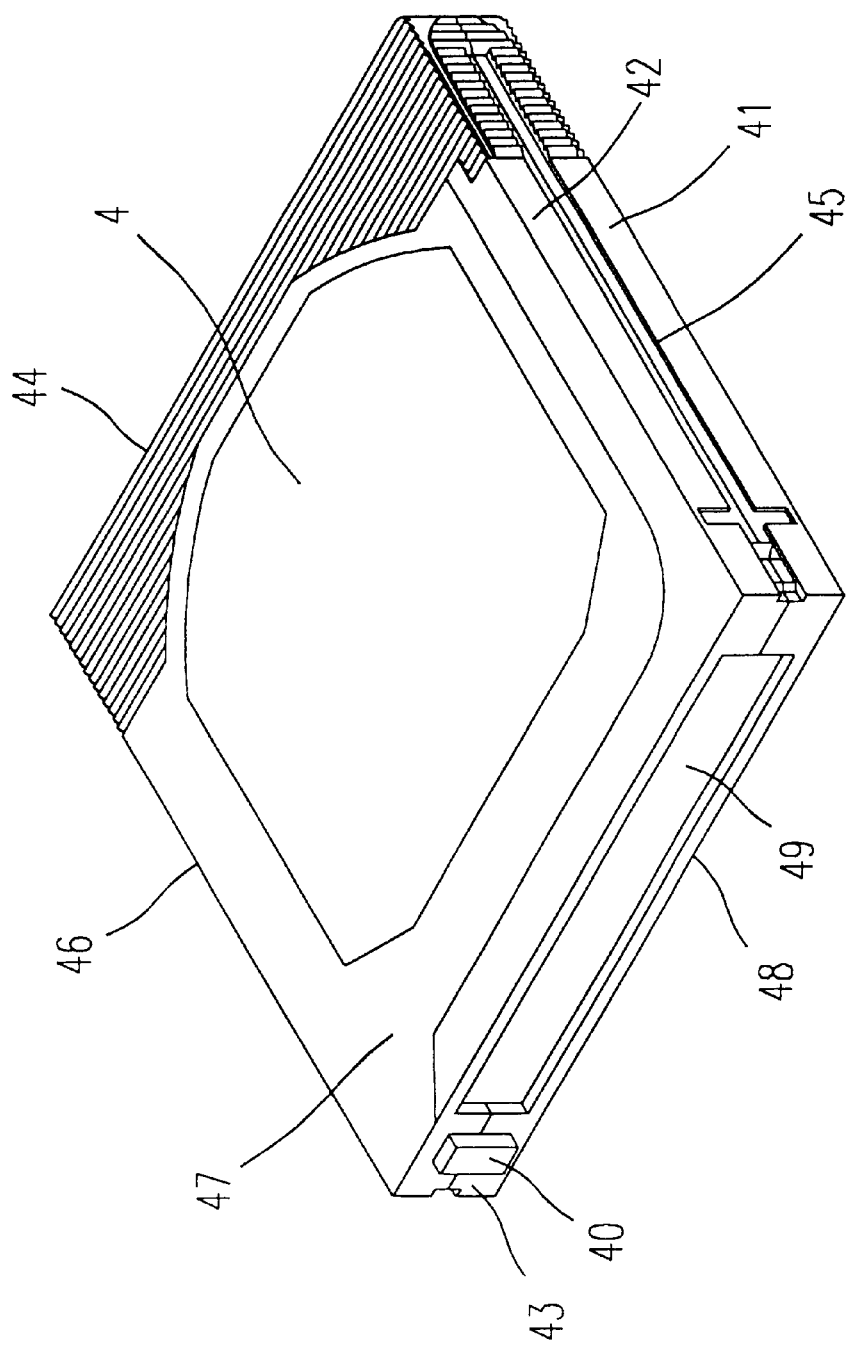
FIG. 4 shows a cartridge with elastic door closed without battery card insertion.
Figure 5:
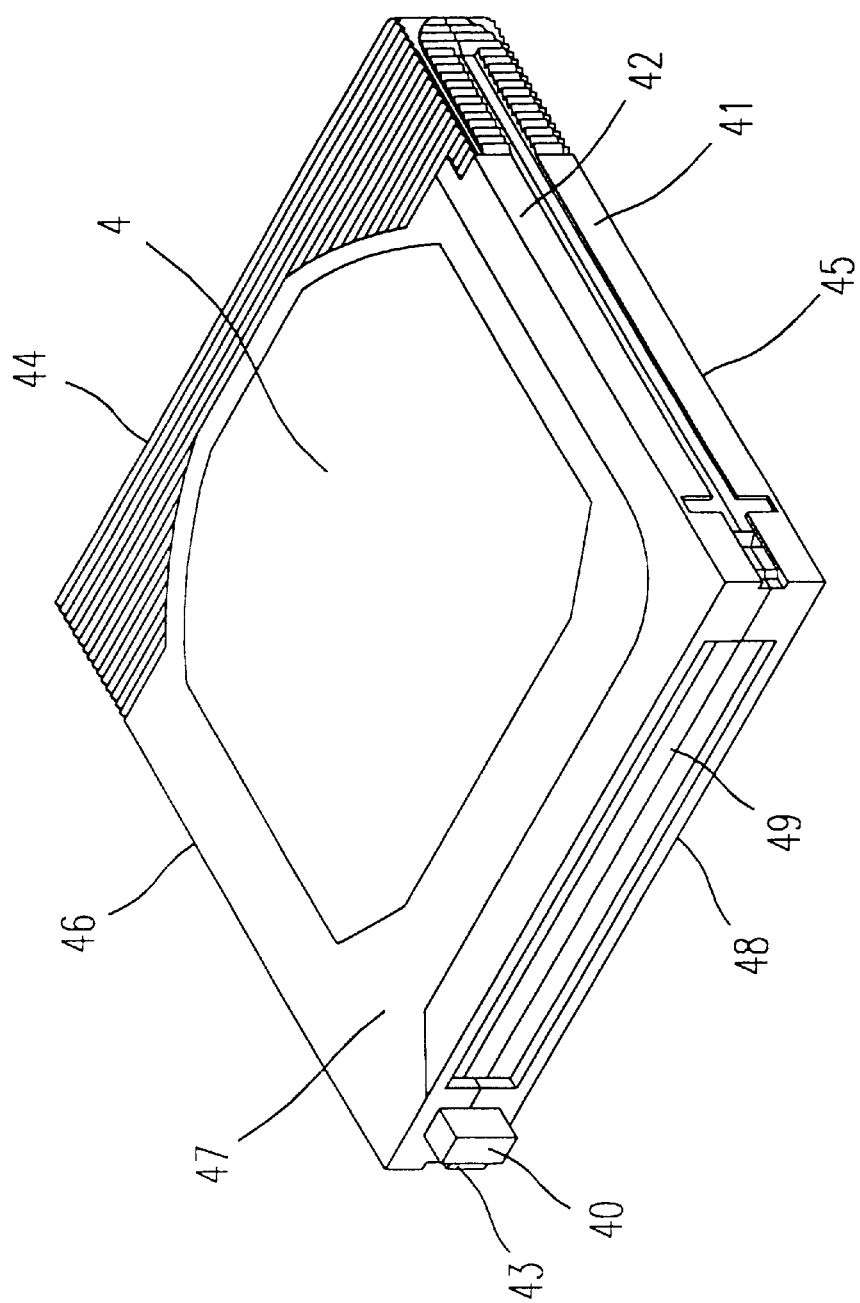
FIG. 5 shows a cartridge with elastic door open with battery card insertion.

The battery card assembly is the host inside the appliance that receives one battery card or multiple battery cards. Battery card assembly can be formed into a PC card cartridge when battery cards designed in PCMCIA specification. FIG. 4 shows a schematic diagram of a cartridge according to the present invention. Battery cartridge 4, if independently designed, has a bottom half shell 41 and a top half shell 42 joined together. The cartridge 4 has front 43, back 44, side surfaces 45, 46, and substantially planar surfaces on the top 47 and in the bottom 48. In addition, the cartridge 4 includes a guiding mechanism (not shown) for guiding the battery card to be inserted into the card slit. The guiding mechanism of the cartridge 4 includes two opposite guiding side rails mounted in the assembly body. Moreover, the cartridge 4 includes a moveable door 49 for enclosing the card slit, and an elastic member (not shown) for always closing the moveable door against the card slit. In FIG. 4, the movable door 49 closes and the actuating button 40 is down when there is no battery card in the cartridge. In FIG. 5, the movable door 49 opens with an up actuating button 40 when battery card inserts. When the user wants to change the battery card, lie can simply push actuating button 40 down to open moveable door 49 to release battery card. In addition, the cartridge 4 includes two conductors (not shown) being electrically connected to the two power contacts of the battery card for receiving therethrough a power from the battery card when the battery card slots in. The cartridge 4 further includes a power cord (not shown) electrically connected to the two conductors and having a terminal connector (not shown).

Figure 6:
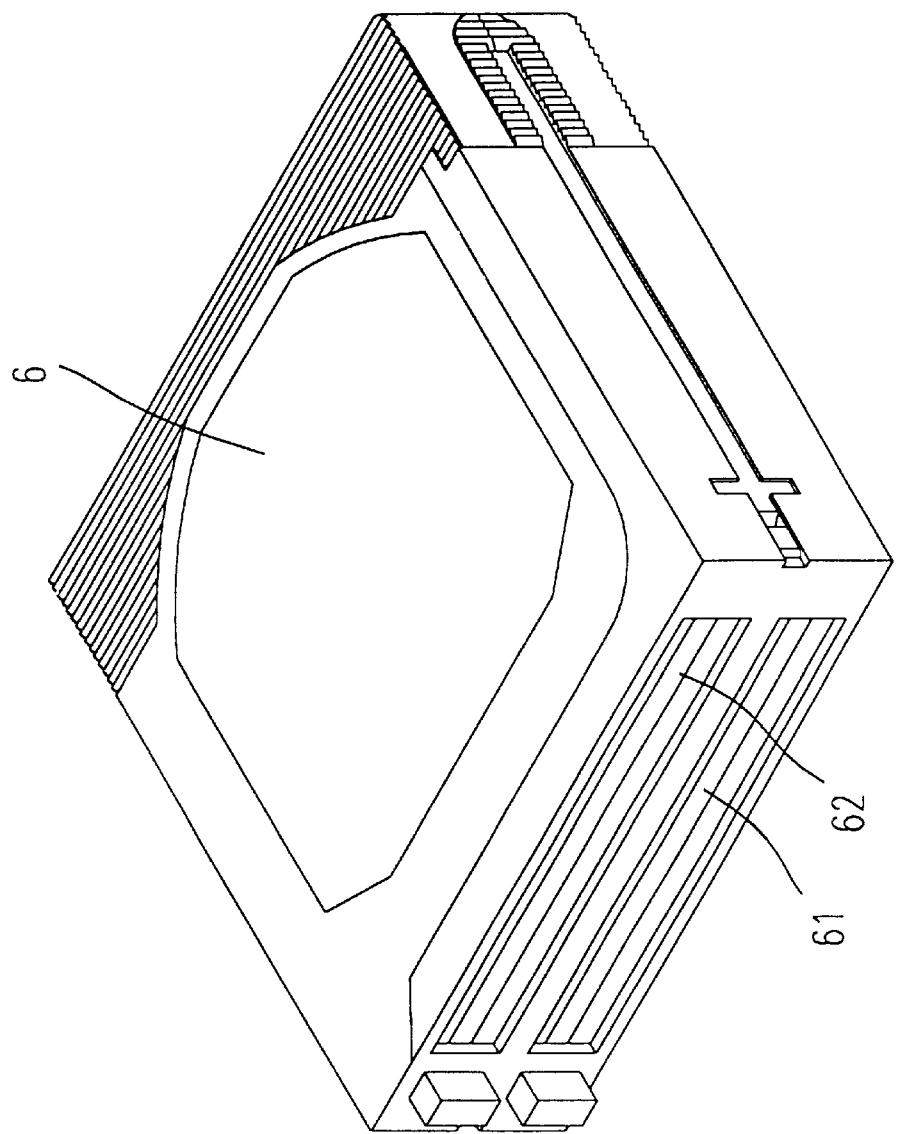
FIG. 6 shows a cartridge with two card slits for inserting therein two battery cards.

Alternatively, the cartridge can be designed to have another card slit for inserting therein another battery card. FIG. 6 shows a cartridge 6 with two card slits (61 and 62) for inserting therein two battery cards. Certainly, those card slits (61 and 62) can be designed to have same size or different sizes. Correspondingly, the battery card can be of the same dimension or different dimensions.

Figure 7A:
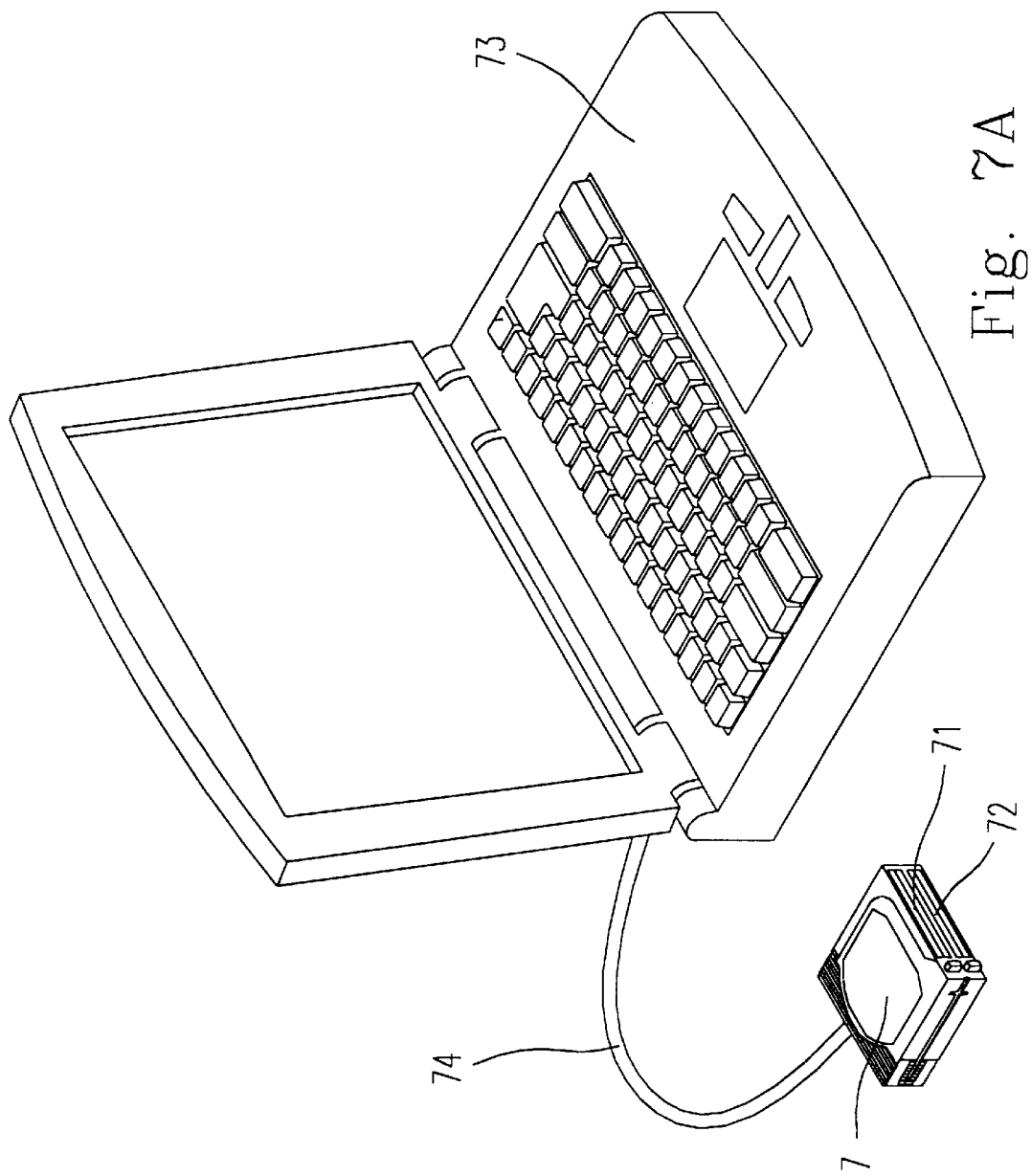
FIG. 7A shows a cartridge electrically connected to a notebook computer by a cable when in use.
Figure 7B:
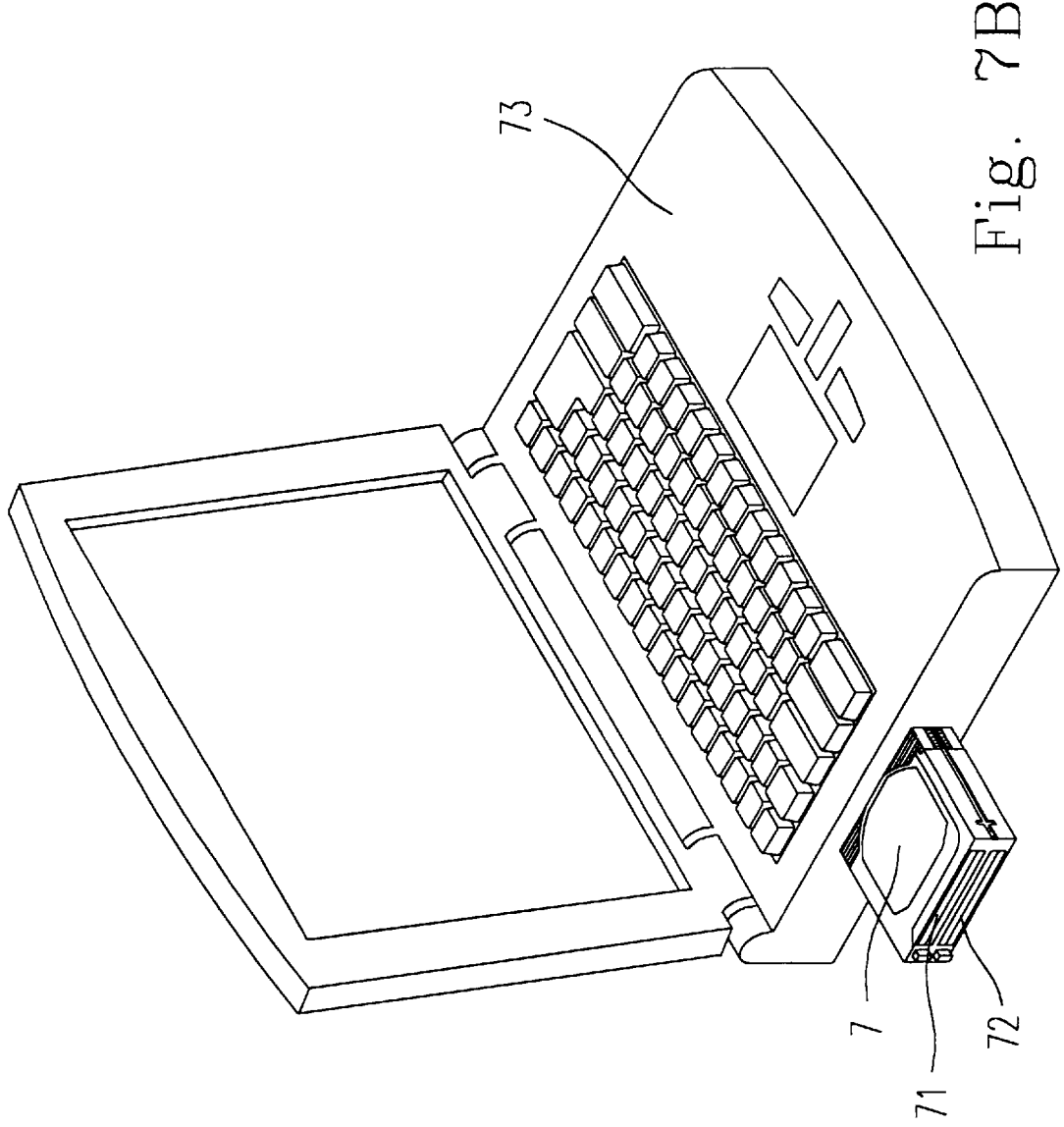
FIG. 7B shows a cartridge directly connected to a notebook computer when in use.

Certainly, in another embodiment, the battery card assembly can be an independent cartridge outside the electrical apparatus. As shown in FIG. 7A, the cartridge 7 with two card slits (71 and 72) can be electrically connected to the notebook computer 73 by a cable 74 when in use. Alternatively, the cartridge 7 with two card slits (71 and 72) can be directly connected to the notebook computer 73 as shown in FIG. 7B.

In the case of using single battery card, the cartridge electrically connects to a power buffer (not shown) in the electrical apparatus when the battery card runs short of the capacity. Changing power connection between the battery card and the power buffer, i.e., a bridge battery and/or a capacitor, by a diode switch, the riser can change the battery card within a certain time interval without turning off the electrical apparatus when the battery card runs short of the capacity.

In the case of using multiple battery cards, the cartridge connects power to the electrical apparatus from only one of the battery card at any given time. Until the first battery card is completely discharged, the cartridge automatically switches the first battery card to another battery card without disturbing the device operation. By changing power connection between battery cards and taking power from only one battery card at any given time, the user can change battery card without turning off the electrical apparatus when one of the battery card runs short of capacity. Therefore, in both cases the appliance operation will not be interrupted when the battery card runs short of the capacity. In addition, the battery card assembly can be designed to electrically connect a capacity detector for detecting how much capacity the battery cards keep, and a power shortage warner which will signal when either one of the battery card nearly runs short of capacity. Certainly, the battery card assembly can be designed to include a display electrically connected to the power shortage warner for warning a user that one of the battery cards runs short of capacity.

Figure 8:
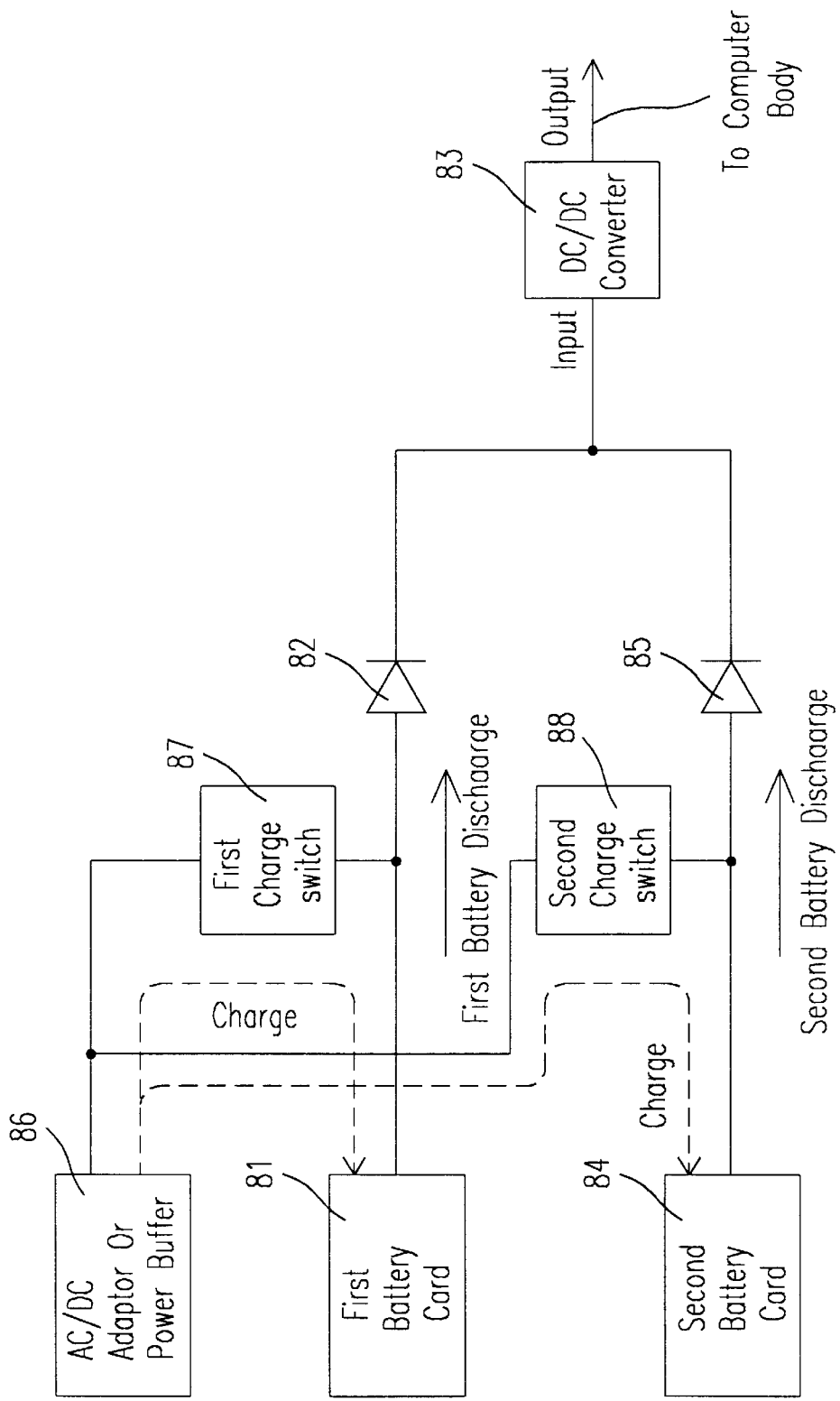
FIG. 8 shows a block diagram of the control circuit in an appliance with two battery cards.

FIG. 8 shows a block diagram of a control circuit in an appliance with two battery cards. A first battery card 81 is connected via a diode 82, which is positioned in the forward direction, to the input terminal of a DC/DC converter 83 that supplies power to the computer. A second battery card 84 is connected to the input terminal of the DC/DC converter 83 via a diode 85, which is also positioned in the forward direction. The first battery card 81 and the second battery card 84 are OR-connected via the diode 82 and diode 85 to the DC/DC converter 83. Power from either the first battery card 81 or the second battery card 84 is supplied to the computer via the diode 82 or the diode 85 and the DC/DC converter 83.

An AC/DC adapter 86, which can also be the power buffer, is connected between the first battery card 81 and the diode 82 through a first charge switch 87, and is further connected between the second battery card 84 and the diode 85 through a second charge switch 88. The AC/DC adapter or the power buffer 86 provides charging routes in addition to a power supply route to the appliance via the DC/DC converter 83. Either the first battery card 81 or the second battery card 84 is charged along the charging rotutes, and power can be supplied to appliance via either the diode 82 or the diode 85 and DC/DC converter 83.

Embodiment of the Battery Card Assembly

1. A Cartridge Containing One Battery Card

A cartridge containing one battery card is designed for being mounted in a slim and compact appliances. A diode switch connects to a power buffer, i.e., a bridge battery and/or a capacitor, when the battery card is disconnected from the cartridge. Users are able to change their battery card without turning off the machine within a certain period of time.

2. A Cartridge Containing More than One Battery Card

A cartridge containing more than one battery card is designed for full function appliances. A diode switch connects to only one of the battery card at any given time. While user extracts the low-capacity battery card out of the cartridge, the cartridge switches to another battery card without disturbing the operation. User can insert a new battery card with full capacity anytime before the second battery card exhausts. However, number of battery card able to be installed in the cartridge should not be limited.

This invention introduces a new battery power system that operates by battery packs in light, thin, safe, and user-friendly card configuration. As portability requires battery packs continue to shrink, solution to the shorter run time dilemma is to design a power system that provides non-interruptible energy by easy swapping unit battery packs in user-friendly formats.

Instead of adding more power to appliance, the present invention brings a different pattern using battery cards to provide a minimum run time that satisfies general applications whereas the system upholds power continuity. With the present invention users carry no more power than they actually need. They no longer worry losing data when battery power exhausts. Moreover, when battery cards are charged on a separate charger outside the appliance or a charger built-in the appliance, issues of public safety can be minimized without adding any inconvenience to mobile users.

According to the described with reference to the accompanying drawings, we can see that the battery power system of the present invention improves the defect encountered by the prior arts.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What we claim is:

1. A battery card assembly adapted to be used with an electrical apparatus, in which said electrical apparatus has a casing having a slot for mounting therein said battery card assembly, to be power-supplied by one of a plurality of battery cards contained in said battery card assembly comprising:

an assembly body insertable into said slot of said electrical apparatus have a plurality of card slits for respectively replaceably inserting therein said plurality of battery cards; and a control circuit for selecting one of said plural battery cards to be active.

2. A battery card assembly according to claim 1 wherein said battery card has a weight energy density larger than 40 watt-hours/kilograms and a volume energy density larger than 100 watt-hours/liter.

3. A battery card assembly according to claim 2 wherein said battery card has said weight energy density larger than 80 watt-hours/kilograms and said volume energy density larger than 200 watt-hours/liter.

4. A battery card assembly according to claim 2 wherein said battery card has a thickness smaller than 1.5 cm.

5. A battery card assembly according to claim 4 wherein said battery card has a thickness smaller than 1.5 cm.

6. A battery card assembly adapted to be used with an electrical apparratus to be power-supplied by one of a plurality of battery cards contained in said battery card assembly comprising:

an assembly body electrically connected to said electrical apparatus and having a plurality of card slits for respectively replaceably inserting therein said plurality of battery cards; and a control circuit for selecting one of said plurality of battery cards to be active.

* * * * *